(12) United States Patent
Liu

(10) Patent No.: US 11,429,870 B2
(45) Date of Patent: Aug. 30, 2022

(54) METHOD FOR CONFIGURING DEEP LEARNING PROGRAM AND CONTAINER MANAGER

(71) Applicant: Fulian Precision Electronics (Tianjin) Co., LTD., Tianjin (CN)

(72) Inventor: Cheng-Yueh Liu, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 586 days.

(21) Appl. No.: 16/523,019

(22) Filed: Jul. 26, 2019

(65) Prior Publication Data
US 2020/0401902 A1 Dec. 24, 2020

(30) Foreign Application Priority Data
Jun. 21, 2019 (CN) .......................... 201910544488.7

(51) Int. Cl.
*G06N 3/10* (2006.01)
*G06F 9/50* (2006.01)
*G06N 3/063* (2006.01)

(52) U.S. Cl.
CPC .......... *G06N 3/105* (2013.01); *G06F 9/5083* (2013.01); *G06N 3/063* (2013.01)

(58) Field of Classification Search
CPC ........ G06N 3/105; G06N 3/063; G06N 5/003; G06N 20/00; G06F 9/5083; G06F 9/45558; G06F 2009/45562; G06F 2009/45591
See application file for complete search history.

(56) References Cited

U.S. PATENT DOCUMENTS

| | | |
|---|---|---|
| 11,257,002 B2 * | 2/2022 | Faulhaber, Jr. .......... G06N 5/04 |
| 2019/0286463 A1 * | 9/2019 | Kuromatsu ............... G06F 8/61 |
| 2020/0174840 A1 * | 6/2020 | Zhao ....................... G06N 3/084 |
| 2020/0250585 A1 * | 8/2020 | Liu .......................... G06N 20/10 |
| 2020/0311617 A1 * | 10/2020 | Swan .................. G06F 9/45558 |

* cited by examiner

*Primary Examiner* — Gil H. Lee
*Assistant Examiner* — Juan C Turriate Gastulo
(74) *Attorney, Agent, or Firm* — ScienBiziP, P.C.

(57) ABSTRACT

A container manager used in a method for configuring a deep learning program acquires deep learning program, and analyzes at least one performance indicator from the acquired deep learning program and sends the at least one performance indicator to a server. The server determines a hardware configuration and a container image according to the at least one performance indicator, generates a label containing the name of the server, the determined hardware configuration, and the container image, and sends the label to the container manager. The container manager receives the label from the server, and determines whether the label contain the name of the server, and deploys a container for the deep learning program if the label contains the name of the server.

13 Claims, 4 Drawing Sheets

METHOD FOR CONFIGURING DEEP LEARNING PROGRAM AND CONTAINER MANAGER

CROSS-REFERENCE TO RELATED APPLICATIONS

This application claims priority to Chinese Patent Application No. 201910544488.7 filed on Jun. 21, 2019, the contents of which are incorporated by reference herein.

FIELD

The subject matter herein generally relates to a method for configuring deep learning program and a container manager.

BACKGROUND

In the prior art, optimization of resource utilization of existing deep learning applications is optimized by code optimization methods. However, resource utilization optimization methods take time and may cause the development life cycle of the deep learning applications becomes overdue.

BRIEF DESCRIPTION OF THE DRAWINGS

Implementations of the present disclosure will now be described, by way of example only, with reference to the attached figures.

DETAILED DESCRIPTION

Figure 1:
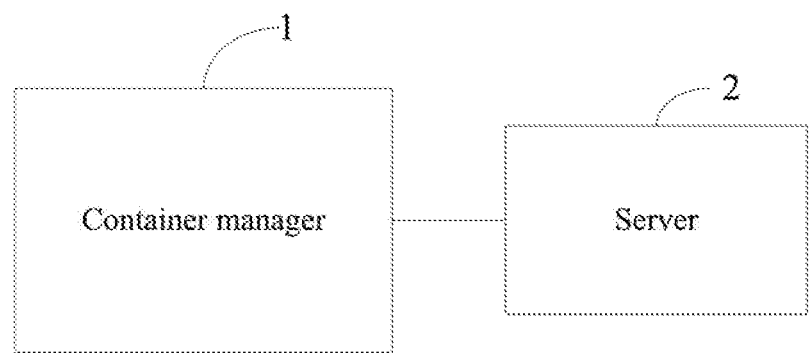
FIG. 1 is a block diagram of one embodiment of a running environment of a method for configuring deep learning program.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of a method for configuring deep learning program. The method is based in a container manager 1 and a server 2. In one embodiment, the container manager 1 communicates with the server 2 by a virtual local network (VLAN). In one embodiment, the container manager 1 can be a Kubernetes container manager or a Kubeflow container manager. The server 2 can be a cloud server or a server cluster.

Figure 2:
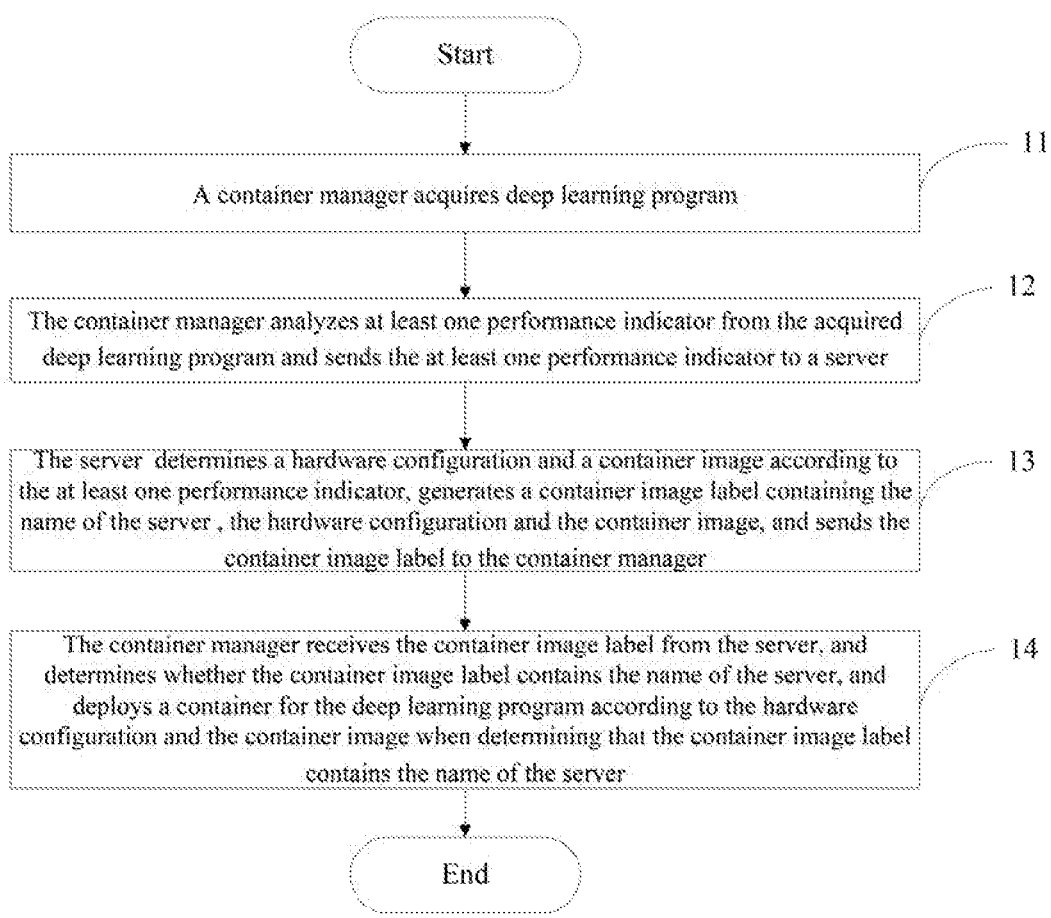
FIG. 2 is a flowchart of one embodiment of the method for configuring deep learning program.

FIG. 2 illustrates a flowchart of the method for configuring deep learning program. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, the container manager 1 acquires deep learning program.

In one embodiment, the deep learning program is stored in the container manager 1, and the container manager 1 acquires deep learning program from the container manager 1. In one embodiment, the deep learning program can be a deep learning application.

At block 12, the container manager 1 analyzes at least one performance indicator from the acquired deep learning program and sends the at least one performance indicator to the server 2.

In one embodiment, the container manager 1 uses an event tracking tool to analyze the at least one performance indicator from the deep learning program. In one embodiment, the event tracking tool can be a Swarm-Oriented Function Call Analysis (SOFA), or a Flame Graph. In one embodiment, the at least one performance indicator includes, but is not limited to, a forward propagation time, a backward time, a data replication time from a host to a graphics processing unit (GPU), and a data replication time from the host to the GPU. In one embodiment, the container manager 1 uses the event tracking tool by a web protocol function "PUT: performance metrics { }" to analyze the forward propagation time, the backward time, the data replication time from the host to the GPU, and the data replication time from the host to the GPU. After analyzing the at least one performance indicator from the deep learning program, the container manager 1 sends the at least one performance indicator in JSON format to the server 2 by a RESTfull interface API.

At block 13, the server 2 determines a hardware configuration and a container image according to the at least one performance indicator, generates a container image label containing the name of the server 2, the hardware configuration, and the container image, and sends the container image label to the container manager 1.

In one embodiment, the server 2 determines the hardware configuration and container image by a preset rule according to the at least one performance indicator to give the deep learning program a minimum running time after utilizing the hardware configuration and container image to encapsulate the deep learning program. In one embodiment, when the forward propagation time is within a first threshold range, the server 2 determines the hardware configuration as setting the communication mode between CPU and the GPU as an NVLink communication mode, and sets the container image as setting application interface. When the forward propagation time is within a second threshold range, the server 2 determines the hardware configuration as setting the communication mode between CPU and the GPU as a PCIe x2 communication mode, and sets the container image as setting application interface. In one embodiment, the first threshold range is less than the second threshold range, and the first threshold range and the second range can be set according to actual needs. In one embodiment, the server 2 determines the hardware configuration as setting the number of CPU cores, memory capacity, and the number of CPUs according to the at least one performance indicator.

In one embodiment, the server 2 determines the hardware configuration and container image by a machine learning method according to the at least one performance indicator to make the deep learning program have a minimum running time after utilizing the hardware configuration and container image to encapsulate the deep learning program. In this embodiment, the machine learning method can be a machine learning method such as clustering or decision tree.

At block 14, the container manager 1 receives the container image label from the server 2, and determines whether the container image label contains the name of the server 2, and deploys a container for the deep learning program according to the hardware configuration and the container image when determining that the container image label contains the name of the server 2.

In the present disclosure, the server 2 determines the hardware configuration and the container image according to the performance indicator of the deep learning program, and the container manager 1 deploys the container for the deep learning program according to the hardware configuration and the container image determined by the server 2. The time for the optimization of the resource utilization of the deep learning program is thus reduced, and the development lifecycle of the deep learning application is shortened.

Figure 3:
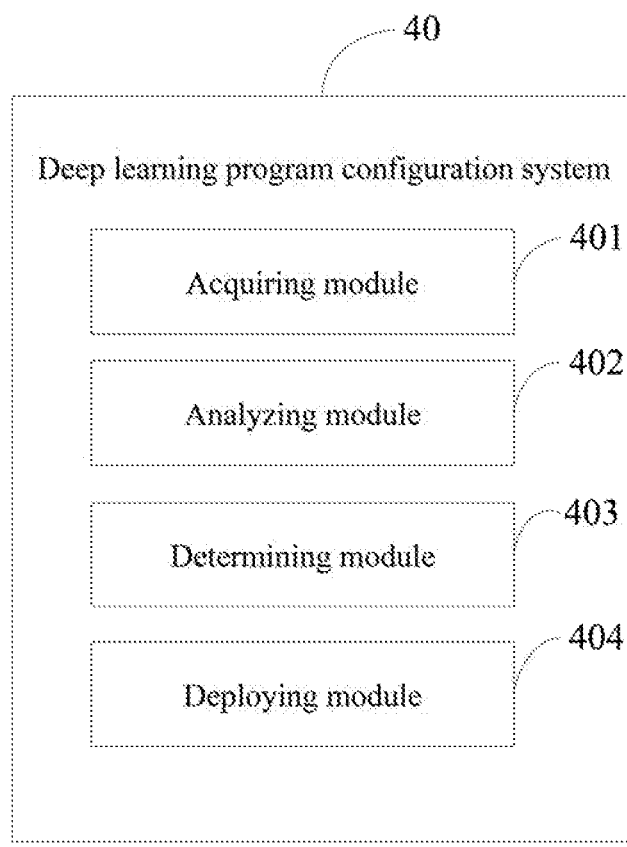
FIG. 3 is a block diagram of one embodiment of a deep learning program configuration system.

FIG. 3 illustrates a deep learning program configuration system 40. In at least one exemplary embodiment, according to the functions it performs, the deep learning program configuration system 40 can be divided into a plurality of functional modules. The functional modules perform the steps 11-24 in the embodiment of FIG. 1 to perform the functions of eliminating adjacent channel interference. The deep learning program configuration system 40 includes, but is not limited to, an acquiring module 401, an analyzing module 402, a determining module 403, and a deploying module 404. The modules 401-404 of the deep learning program configuration system 40 can be collections of software instructions. In one embodiment, the acquiring module 401, the analyzing module 402, and the deploying module 404 are applied in the container manager 1. The determining module 403 is applied in the server 2.

The acquiring module 401 acquires deep learning program.

In one embodiment, the deep learning program is stored in the container manager 1, and the acquiring module 401 acquires deep learning program from the container manager 1. In one embodiment, the deep learning program can be a deep learning application.

The analyzing module 402 analyzes at least one performance indicator from the acquired deep learning program and sends the at least one performance indicator to the server 2.

In one embodiment, the analyzing module 402 uses an event tracking tool to analyze the at least one performance indicator from the deep learning program. In one embodiment, the event tracking tool can be a Swarm-Oriented Function Call Analysis (SOFA), or a Flame Graph. In one embodiment, the at least one performance indicator includes, but is not limited to, a forward propagation time, a backward time, a data replication time from a host to a graphics processing unit (GPU), and a data replication time from the host to the GPU. In one embodiment, the analyzing module 402 uses the event tracking tool by a web protocol function "PUT: performance metrics { }" to analyze the forward propagation time, the backward time, the data replication time from the host to the GPU, and the data replication time from the host to the GPU. After analyzing the at least one performance indicator from the deep learning program, the analyzing module 402 sends the at least one performance indicator in JSON format to the server 2 by a RESTfull interface API.

The determining module 403 determines a hardware configuration and a container image according to the at least one performance indicator, generates a container image label containing the name of the server 2, the hardware configuration, and the container image, and sends the container image label to the container manager 1.

In one embodiment, the determining module 403 determines the hardware configuration and container image by a preset rule according to the at least one performance indicator to give the deep learning program a minimum running time after utilizing the hardware configuration and container image to encapsulate the deep learning program. In one embodiment, when the forward propagation time is within a first threshold range, the determining module 403 determines the hardware configuration as setting the communication mode between CPU and the GPU as an NVLink communication mode, and sets the container image as setting application interface. When the forward propagation time is within a second threshold range, the determining module 403 determines the hardware configuration as setting the communication mode between CPU and the GPU as a PCIe x2 communication mode, and sets the container image as setting application interface. In one embodiment, the first threshold range is less than the second threshold range, and the first threshold range and the second range can be set according to actual needs. In one embodiment, the determining module 403 determines the hardware configuration as setting the number of CPU cores, memory capacity, and the number of CPUs according to the at least one performance indicator.

In one embodiment, the determining module 403 determines the hardware configuration and container image by a machine learning method according to the at least one performance indicator to make the deep learning program have a minimum running time after utilizing the hardware configuration and container image to encapsulate the deep learning program. In this embodiment, the machine learning method can be a machine learning method such as clustering or decision tree.

The deploying module 404 receives the container image label from the server 2, and determines whether the container image label contains the name of the server 2. A container for the deep learning program is deployed according to the hardware configuration and the container image when determining that the container image label contains the name of the server 2.

In the present disclosure, the determining module 403 determines the hardware configuration and the container image according to the performance indicator of the deep learning program, and the deploying module 404 deploys the container for the deep learning program according to the hardware configuration and the container image. The time for the optimization of the resource utilization of the deep learning program is thus reduced, and the development lifecycle of the deep learning application is shortened.

Figure 4:
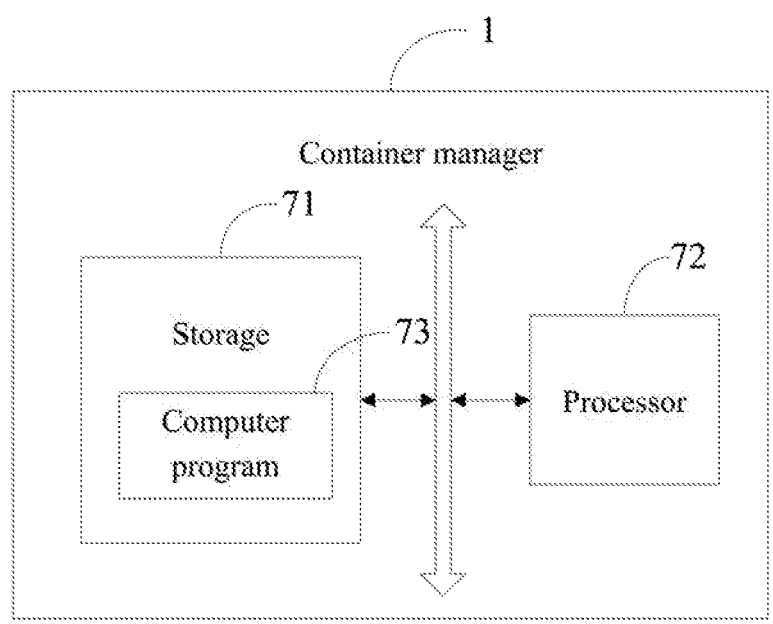
FIG. 4 is a schematic diagram of one embodiment of a container manager used in the method of FIG. 1.

FIG. 4 illustrates the container manager 1. The container manager 1 includes a storage 71, a processor 72, and a computer program 73 stored in the storage 71 and executed by the processor 72. When the processor 72 executes the computer program 73, the steps in the embodiment of the method for eliminating adjacent channel interference are implemented, for example, steps 11 to 14 as shown in FIG. 2. Alternatively, when the processor 72 executes the computer program 73, the functions of the modules in the embodiment of the system for eliminating adjacent channel interference are implemented, for example, modules 401-403 shown in FIG. 3.

In one embodiment, the computer program 73 can be partitioned into one or more modules/units that are stored in the memory 71 and executed by the processor 72. The one or more modules/units may be a series of computer program instruction segments capable of performing a particular function, and the instruction segments describe the execution of the computer program 72 in the container manager 1. For example, the computer program 73 can be divided into the acquiring module 401, the analyzing module 402, and the deploying module 404 as shown in FIG. 5. Alternatively, the computer program 13 can be divided into the acquiring module 201, the predicting module 202, the trend line generation module 203, the first determining module 204, the second determining module 205, and the processing module 206 as shown in FIG. 3.

FIG. 4 shows only one example of the container manager 1. There are no limitations of the container manager 1, and other examples may include more or less components than those illustrated, or some components may be combined, or have a different arrangement. The components, such as the container manager 1, may also include input devices, output devices, communication unit, network access devices, buses, and the like.

The processor 72 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 72 may be a microprocessor or the processor may be any conventional processor or the like. The processor 72 is the control center of the container manager 1, and connects the entire container manager 1 by using various interfaces and lines.

The storage 71 stores data and programs of the container manager 1. For example, the storage 71 can store the deep learning program configuration system 40 for eliminating adjacent channel interference, preset face images, and preset voices. In at least one exemplary embodiment, the storage 71 can include various types of non-transitory computer-readable storage mediums. For example, the storage 71 can be an internal storage system, such as a flash memory, a random access memory for temporary storage of information, and/or a read-only memory for permanent storage of information. The storage 71 can also be an external storage system, such as a hard disk, a storage card, or a data storage medium.

In one embodiment, the modules/units integrated in the container manager 1 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A container manager comprising:
   a processor; and
   a non-transitory storage medium coupled to the processor and configured to store a plurality of instructions, which cause the container manager to:
      acquire a deep learning program;
      analyze at least one performance indicator from the acquired deep learning program and send the at least one performance indicator to a server, wherein the server
         determines a hardware configuration and a container image according to the at least one performance indicator,
         generates a container image label containing the name of the server, the determined hardware configuration and the container image, and
         sends the container image label to the container manager; and
      receive the container image label from the server, and determine whether the container image label contain the name of the server, and deploy a container for the deep learning program according to the hardware configuration and the container image if the container image label contains the name of the server.

2. The container manager as recited in claim 1, wherein the plurality of instructions are further configured to cause the container manager to:
use an event tracking tool to analyze the at least one performance indicator from the deep learning program.

3. The container manager as recited in claim 1, wherein the plurality of instructions are further configured to cause the container manager to:
use the event tracking tool to analyze the at least one performance indicator from the deep learning program by a http web protocol function.

4. The container manager as recited in claim 2, wherein the event tracking tool can be a Swarm-Oriented Function Call Analysis, or a Flame Graph.

5. The container manager as recited in claim 1, wherein the at least one performance indicator comprises a forward propagation time, a backward time, a data replication time from a host to a graphics processing unit (GPU), and a data replication time from the host to the GPU.

6. A method for configuring deep learning program comprising:
a container manager acquiring a deep learning program;
the container manager analyzing at least one performance indicator from the acquired deep learning program and sending the at least one performance indicator to a server;
the server determining a hardware configuration and a container image according to the at least one performance indicator, generating a container image label containing the name of the server, the determined hardware configuration and the container image, and sending the container image label to the container manager; and
the container manager receiving the container image label from the server, and determining whether the container image label contain the name of the server, and deploying a container for the deep learning program according to the hardware configuration and the container image if the container image label contains the name of the server.

7. The method as recited in claim 6, further comprising:
the server determining the hardware configuration and container image by a preset rule according to the at least one performance indicator to make the deep learning program have a minimum running time after utilizing the hardware configuration and container image to encapsulates the deep learning program.

8. The method as recited in claim 7, further comprising:
when a forward propagation time is within a first threshold range, the server determining the hardware configuration as setting a communication mode between a CPU and a graphics processing unit (GPU) as a NVLink communication mode, and setting the container image as setting application interface; when the forward propagation time is within a second threshold range, the server determining the hardware configuration as setting the communication mode between the CPU and the GPU as a PCIex2 communication mode, and setting the container image as setting application interface.

9. The method as recited in claim 6, further comprising:
the server determining the hardware configuration as setting a plurality of CPU's cores, memory capacity, and a plurality of CPUs according to the at least one performance indicator.

10. The method as recited in claim 6, further comprising:
the container manager using an event tracking tool to analyze the at least one performance indicator from the deep learning program.

11. The method as recited in claim 10, further comprising:
the container manager using the event tracking tool to analyze the at least one performance indicator from the deep learning program by a web protocol function.

12. The method as recited in claim 11, wherein the event tracking tool can be a Swarm-Oriented Function Call Analysis, or a Flame Graph.

13. The method as recited in claim 6, wherein the at least one performance indicator comprises a forward propagation time, a backward time, a data replication time from a host to a graphics processing unit (GPU), and a data replication time from the host to the GPU.

* * * * *